(12) United States Patent
Perreten et al.

(10) Patent No.: US 10,399,626 B2
(45) Date of Patent: Sep. 3, 2019

(54) MOLDABLE BICYCLE SADDLES, FITTING PROCEDURES, AND RELATED TECHNOLOGIES

(71) Applicant: Versal Manufacturing, Inc., Vancouver (CA)

(72) Inventors: Michael Perreten, North Vancouver (CA); Aaron Brown, Delta (CA); Dylan Schuetze, Vancouver (CA); Thomas Edstrand, North Vancouver (CA)

(73) Assignee: Versal Manufacturing, Inc., Vancouver (CA)

( * ) Notice: Subject to any disclaimer, the term of this patent is extended or adjusted under 35 U.S.C. 154(b) by 0 days.

(21) Appl. No.: 16/358,600

(22) Filed: Mar. 19, 2019

(65) Prior Publication Data

US 2019/0210678 A1   Jul. 11, 2019

Related U.S. Application Data

(63) Continuation of application No. PCT/IB2018/001482, filed on Sep. 17, 2018.

(60) Provisional application No. 62/560,095, filed on Sep. 18, 2017.

(51) Int. Cl.
*B62J 1/10* (2006.01)
*B62J 1/00* (2006.01)

(52) U.S. Cl.
CPC  *B62J 1/10* (2013.01); *B62J 1/007* (2013.01)

(58) Field of Classification Search
CPC .................................. B62J 1/007; B62J 1/10
See application file for complete search history.

(56) References Cited

U.S. PATENT DOCUMENTS

| 3,997,214 | A | | 12/1976 | Jacobs | |
|---|---|---|---|---|---|
| 4,615,856 | A | * | 10/1986 | Silverman | A61F 5/01 264/102 |
| 5,348,369 | A | | 9/1994 | Yu | |
| 6,066,277 | A | * | 5/2000 | Lee | B29C 44/0407 264/271.1 |
| 6,990,744 | B2 | * | 1/2006 | Bieganek | A47C 7/021 33/515 |
| 8,308,234 | B2 | | 11/2012 | Segato | |

(Continued)

FOREIGN PATENT DOCUMENTS

| DE | 3625210 A1 | 2/1988 |
|---|---|---|
| EP | 1862382 A1 | 12/2007 |

(Continued)

OTHER PUBLICATIONS

International Search Report and Written Opinion for counterpart International Application No. PCTIB2018/001482; dated Apr. 15, 2019; 14 pages.

*Primary Examiner* — Timothy J Brindley
(74) *Attorney, Agent, or Firm* — Perkins Coie LLP

(57) ABSTRACT

A bicycle saddle can be customized to a rider's body to achieve desired support and comfort. The bicycle saddle includes an inner support shell and a moldable panel. The moldable panel is configured to be molded to the subject's anatomy. The support shell is configured to support a rider's body and can include at least one internal thermal element operable to heat the bicycle saddle such that the panel is molded to the rider's anatomy while the rider is sitting on the bicycle saddle.

20 Claims, 14 Drawing Sheets

(56) References Cited

U.S. PATENT DOCUMENTS

| | | | |
|---|---|---|---|
| D718,543 S | 12/2014 | Smith et al. | |
| 8,973,986 B1 | 3/2015 | Marceleno | |
| 9,039,082 B2 | 5/2015 | Truglio | |
| D753,926 S | 4/2016 | Smith et al. | |
| 9,446,808 B2 | 9/2016 | Marui | |
| 10,124,535 B2* | 11/2018 | Yu | B29C 43/203 |
| 2003/0167557 A1* | 9/2003 | LaShoto | A41D 13/015 |
| | | | 2/228 |
| 2004/0232742 A1* | 11/2004 | Oehler | A61B 5/103 |
| | | | 297/195.1 |
| 2005/0025953 A1* | 2/2005 | Hetzel | A47C 31/126 |
| | | | 428/304.4 |
| 2005/0075046 A1* | 4/2005 | Williams | A41D 13/05 |
| | | | 450/1 |
| 2005/0121951 A1 | 6/2005 | Yu | |
| 2008/0018147 A1* | 1/2008 | Ybarrola | B29C 44/1204 |
| | | | 297/214 |
| 2008/0093898 A1 | 4/2008 | Chiang | |
| 2008/0201828 A1* | 8/2008 | Kanavage | A41D 13/015 |
| | | | 2/459 |
| 2015/0298752 A1* | 10/2015 | Tseng | B62J 1/007 |
| | | | 297/199 |

FOREIGN PATENT DOCUMENTS

| | | |
|---|---|---|
| WO | 2009093124 A1 | 7/2009 |
| WO | 2017035645 A1 | 3/2017 |

\* cited by examiner

MOLDABLE BICYCLE SADDLES, FITTING PROCEDURES, AND RELATED TECHNOLOGIES

RELATED APPLICATION

The present application is a continuation of International Application No. PCT/IB2018/001482, filed Sep. 17, 2018, which claims the benefit of U.S. Provisional Patent Application No. 62/560,095, filed Sep. 18, 2017. The disclosure of both applications are incorporated herein by reference in their entireties.

TECHNICAL FIELD

The present invention relates generally to the field of bicycles and bicycle saddles. In particular, the present disclosure relates to customizable bicycle saddles, moldable seats, and fitting procedures.

BACKGROUND

Bicycles are used throughout the world for recreation, exercise, and transportation. Conventional bicycle saddles may not comfortably support a rider's sit bones, which can lead to discomfort and pain. Conventional bicycle saddles may also not be well suited for many riders because rider anatomies often vary greatly. Additionally, if the rider's weight or size changes significantly, a saddle may become uncomfortable, requiring installation of a new saddle.

BRIEF DESCRIPTION OF THE DRAWINGS

FIG. 20$b$ is a cross-sectional view of the support shell taken along line 20$b$-20$b$ of FIG. 19 in accordance with another embodiment of the technology.

DETAILED DESCRIPTION

Overview

Figure 1:
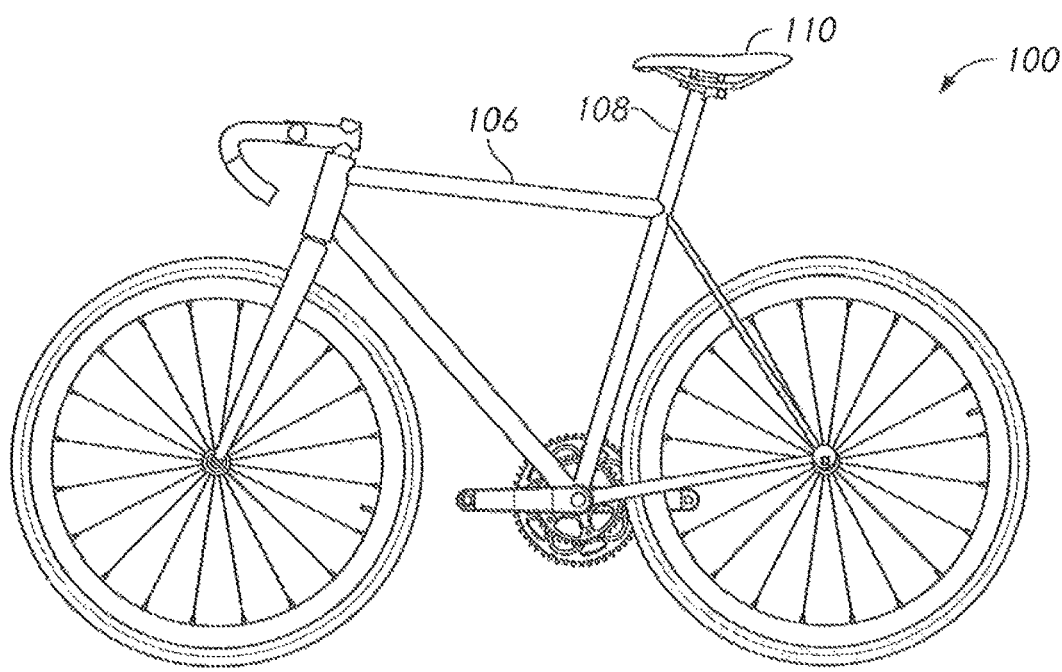
FIG. 1 is a side view of a bicycle with a customized bicycle saddle in accordance with an embodiment of the technology.

In some embodiments, a customizable bicycle saddle can have a thermoformable material and one or more internal heaters operable to selectively heat the thermoformable material. The heated thermoformable material can be molded to conform to the user's anatomy to achieve a desired level of comfort, performance, and/or body position. The saddle can be molded multiple times to achieve a desired customized fit.

The bicycle saddle can have a support shell and a padding or cushioning member covering the support shell. The cushioning member can serve as an insulator that limits or inhibits heat transfer from the internal heaters to the rider. This allows the upper surface of bicycle saddle to remain at a sufficiently low temperature to inhibit or prevent discomfort or burning of the rider. For example, the upper surface of the saddle can be kept at or below a first temperature (e.g., 40° C., 41° C., 42° C., 43° C., 44° C., 45° C., or 46° C.) while a moldable element of the support shell is at a molding temperature (e.g., 50° C., 60° C., 70° C., or 80° C.). The moldable element can be made, in whole or in part, of a thermoplastic material. In other embodiments, the moldable element can be made, in whole or in part, of the thermoset material. The support shell can have a rigid base shell that not plastically deformed during the molding process. In various heating procedures, the saddle can be preheated by the heaters. After the rider sits on the saddle, the heaters can periodically or continuously heat the saddle.

In some embodiments, a customizable bicycle saddle includes a support shell configured to support a rider's body. The support shell includes at least one internal thermal element capable of heating the support shell to mold the support shell to a rider's anatomy. The thermal element can be embedded within the customizable bicycle saddle and configured to heat discrete regions of the support shell that are subjected to relatively high applied pressures. For example, the thermal element can be positioned to heat regions of the support shell that support the rider's sit bones to a predetermined temperature equal to or greater than a softening temperature, a glass transition temperature, or a melt temperature of those regions. In some embodiments, the internal thermal element can be integrated into a unitary body of the support shell. In other embodiments, the support shell includes a frame member and separate thermoformable panels. The thermoformable panels can be positioned within openings or receiving features which allow for downward displacement of at least portions of the panels.

A rider can use the saddle without being able to detect the internal thermal elements because the internal heater can be positioned underneath a cushioning member, such as foam padding. Alternatively, the internal thermal element can be embedded in or underneath the thermoformable panels or base shell, thus making the internal thermal element undetectable to the rider during normal use. When the heater is turned on, it can generate a sufficient amount of thermal energy for molding the thermoformable panels. Any number of thermoforming processes can be performed to achieve a desired fit. The saddle can be allowed to cool to the ambient temperature (e.g., room temperature) to set the shape of the saddle. The molding process can be performed any number of times to achieve the desired fit.

In some embodiments, a bicycle saddle includes a plurality of receiving features and one or more thermoformable panels overlaying the receiving features of a base shell. The panels can be customized to the rider's body. For example, each panel can be positioned directly underneath one of the user's sit bones while the rider uses the saddle. The panels can be molded when heated above a predetermined temperature that can be at least 10° C., 20° C., 30° C., or 40° C. above room temperature, so the panels maintain their molded shape when used in normal environments.

The saddle can be molded to achieve a desired reduction in the highest rider applied pressure, typically generally underneath the rider's sit bones. The reduction can be equal to or less than, for example, about 3%, about 5%, about 10%, about 15%, about 20%, about 25%, or about 30%. For example, the highest pressure applied by the rider's sit bones to the saddle can be reduced at least about 5% by the fitting process. The cushion material that overlays the support shell can be selected to further enhance comfort.

A thermal insulating molding cover can be placed on the support shell prior to molding. Once molding has been completed, another cover and padding can be installed on the support shell. A foam cushion can be installed to provide desired comfort. In other embodiments, the cushioning member can be permanently coupled to the support shell, and the support shell can be molded while the cushioning member provides thermal insulation.

The thermal elements can be integrated into the saddle such that the surrounding saddle components prevent moisture or contaminants from affecting the thermal elements. In other embodiments, the thermal elements can be temporarily attached to the saddle. Once molding is complete, the thermoelement can be detached from the saddle. This allows the saddle to be kept at a relatively low weight and reduces the likelihood of damage to reusable thermal elements.

In certain embodiments, a bicycle saddle can have different states to perform molding. In a first state, the saddle can generate heat for thermoforming. A rigid support shell can be thermoformed to the rider's body to provide a comfortable fit. In another state (e.g., an off state), the shell can maintain its shape. The bicycle saddle can have one or more sensors to monitor the fitting process.

A customizable bicycle saddle can comprise a support shell and a customizable ischial tuberosity panel. The support shell can include a first receiving feature and a second receiving feature. The ischial tuberosity panel can include one or more moldable materials, thermoplastic materials, or the like. In some embodiments, the panel includes a first ischial tuberosity bone supporting portion positionable in the first receiving feature and a second ischial tuberosity bone supporting portion positionable in the second receiving feature. The ischial tuberosity panel can be configured to mold to a rider's anatomy sitting on the customizable bicycle saddle after the thermoformable ischial tuberosity panel has been heated above a predetermined temperature.

The customizable ischial tuberosity panel can be configured to retain the rider's geometry when at room-temperature and is configured to be remolded when heated above the predetermined temperature. The inner support shell has a spine extending longitudinally along the bicycle saddle, and the spine is positioned between the first and second receiving features. The predetermined temperature can be a softening temperature, glass transition temperature, or a melt temperature of the thermoplastic material. The properties of the panel can be selected based on the desired customization process.

The bicycle saddle can include a cushion configured to cover the inner support shell and a heater. The heater is positioned between the cushion and the inner support shell and has a heating state for heating the thermoformable ischial tuberosity pad to the molding temperature. In some embodiments, the heater can include one or more thermoelectric heaters configured to receive electrical energy and to generate a sufficient amount of thermal energy to heat the moldable ischial tuberosity panel.

In some embodiments, a bicycle saddle comprises an inner support shell including a first receiving feature and second receiving feature and a moldable panel. The moldable panel has a first portion and a second portion. The first portion is positionable in the first receiving feature, and the second portion is positionable in the second receiving feature. The moldable panel is configured to be thermoformable to accommodate a subject's anatomy to reduce high-pressure spots when the subject sits on the bicycle saddle.

The first receiving feature can be positioned to be underneath one of the subject's ischial tuberosity bones and the second receiving feature is positioned to be underneath the other one of the subject's ischial tuberosity bone. One or both of the first and second receiving features are openings.

In further embodiments, a bicycle saddle comprises an inner support shell including at least one receiving-feature and a moldable panel. The moldable panel is positionable in the at least one receiving-feature and is configured to fit the subject's anatomy. The moldable panel can include or be in thermal contact with one or more thermoelectric elements.

A method for fitting a bicycle saddle includes sensing a first pressure applied by a rider to the bicycle saddle, heating a moldable panel of the bicycle saddle, and molding the heated moldable panel to at least a portion of the rider. After molding the moldable panel, a second pressure applied by the rider to the bicycle saddle is sensed and compared to the first pressure. The method can further include detecting applied pressures to determine whether to reheat the moldable panel.

In some embodiments, a bicycle saddle can have one or more selectively moldable portions for accommodating a rider's anatomy. The portions can be positioned to minimize, limit, or substantially eliminate pressure hotspots. The number, position, and characteristics of the moldable portions can be selected based on the rider's gender, specific anatomy, and type of riding. The bicycle saddle can be a road bicycle saddle, mountain bicycle saddle, touring bicycle saddle, or the like.

The bicycle saddles can be formed in multi-step processes. For example, a support shell can be thermoformed to the rider's body. In a separate process, a cushioning member (e.g., cushioning member 170 of FIG. 5) can be customized in another process, such as a thermoforming process. This allows different parts of saddles to be customized individually to provide a desired fit. Although the bicycle saddles can be molded when fully assembled, the bicycle saddles can be partially or completely disassembled for molding and then reassembled. The dimensions, configurations, and materials of the seats or saddles can be selected based on the anatomy of the rider. Additionally, materials, saddles, techniques disclosed herein can be used with other types of seats or support elements.

In further embodiments, moldable elements of a saddle can extend across a substantial portion of the area that supports most of the rider's weight during use. In some embodiments, the moldable elements support at least 30%, 40%, 50%, 60%, 70%, 80%, or 90% of the user's weight applied to the saddle. Other portions of the saddle can be made of semi-rigid or rigid materials that generally maintain its shape. This allows the saddle to have selectively moldable regions suitable for thermoforming areas at which substantial pressure is applied. The rigid frame maintains the general overall contours and configuration of the saddle.

Moldable Bicycle Saddles and Fitting Procedures

FIG. 1 is a side view of a bicycle 100 with a bicycle frame 106, a seat post 108, and a bicycle saddle or seat 110 ("saddle 110"). The saddle 110 is connected to the bicycle frame 106 by the seat post 108. The saddle 110 can be custom fit to a rider using a fitting procedure involving thermoforming the saddle 110 to the rider's anatomy. The customized saddle 110 can provide a comfortable fit and can be reshaped any number of times to adjust the fit. If the rider's weight or size changes significantly, the saddle 110 can be remolded, for example. The bicycle 100 can be a road bike, mountain bike, touring bike, cruiser bicycle, or other type of bicycle.

The saddle 110 can be configured and customized based on the rider's anatomy, bicycle configuration, and/or other fitting criteria. For example, a female-specific saddle may be wider than a male-specific saddle because an average female typically has wider spacing between ischial tuberosities (i.e., sit bones). In another example, the saddle 110 can be a touring saddle or seat with a relatively long narrow nose for long distance rides. The configuration (e.g., overall shape), properties (e.g., cushioning properties), and construction of the saddle can be selected based on, for example, the saddles intended use.

Figure 2:
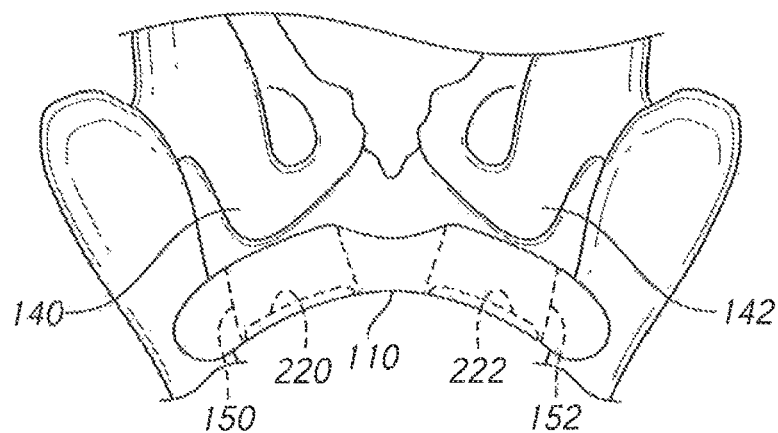
FIG. 2 is a rear view of a rider sitting on the bicycle saddle of FIG. 1.
Figure 3:
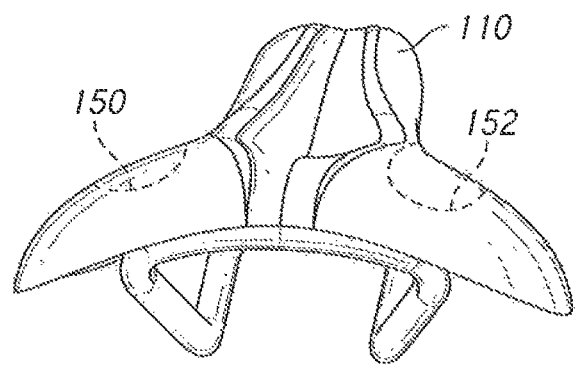
FIG. 3 is a rear perspective view of the bicycle saddle of FIG. 1.

FIG. 2 is a rear view of a rider's bones when sitting on the saddle 110. FIG. 3 shows the saddle 110 with moldable regions or portions 150, 152 (illustrated in a dashed line). The moldable portions 150, 152 can be positioned at desired locations to manage applied pressures. In some embodiments, the moldable portions 150, 152 can be positioned generally underneath respective sit bones 140, 142 (FIG. 2). The moldable portions 150, 152 can include one-piece or multi-piece moldable panels, moldable layers (e.g., foam layers), pads, inserts, or other elements that can be reshaped (e.g., via a thermal process) to conform to a user's body. The configuration, number of moldable regions, and their locations can be selected based on the configuration of the bicycle. For example, the sizes of the moldable regions for a road bicycle saddle can be different than the sizes of moldable regions for a mountain bicycle saddle. Although moldable panels are discussed primarily in the context of managing the pressure points associated with sit bones, the seats and saddles disclosed herein can be configured to manage pressures at other locations and can be fitted with or without taking any measurements during the fitting process.

Figure 4:
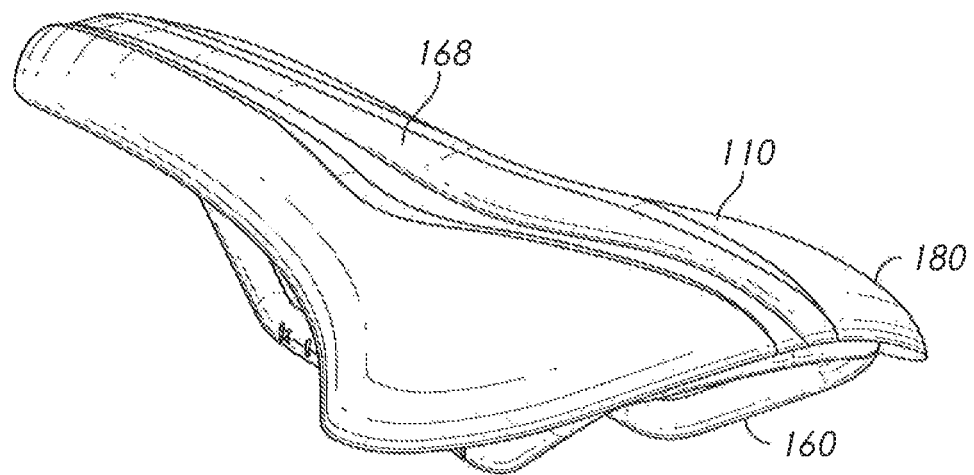
FIG. 4 is an isometric view of a bicycle saddle in accordance with an embodiment of the technology.

FIG. 4 is an isometric view of the saddle 110 in accordance with an embodiment of the technology. The saddle 110 can include a rail system 160 that can connect the bicycle saddle 110 to the seat post. The rail system 160 can include a pair of rails made, in whole or in part, of metal (e.g., titanium, aluminum, steel, etc.), polymers, composite materials (e.g., carbon fiber composite material, metal coated composite materials, etc.), or other suitable material. The configuration of the rail system 160 can be selected based on the connection to the seat post. The saddle 110 can also include a covering 180 that can be made, in whole or in part, of one or more natural materials (e.g., leather, cotton, etc.), synthetic materials (e.g., synthetic leather, nylon, etc.), or other suitable materials and can include one or more features, such as an optional groove, channel, or cutout 168.

Figure 5:
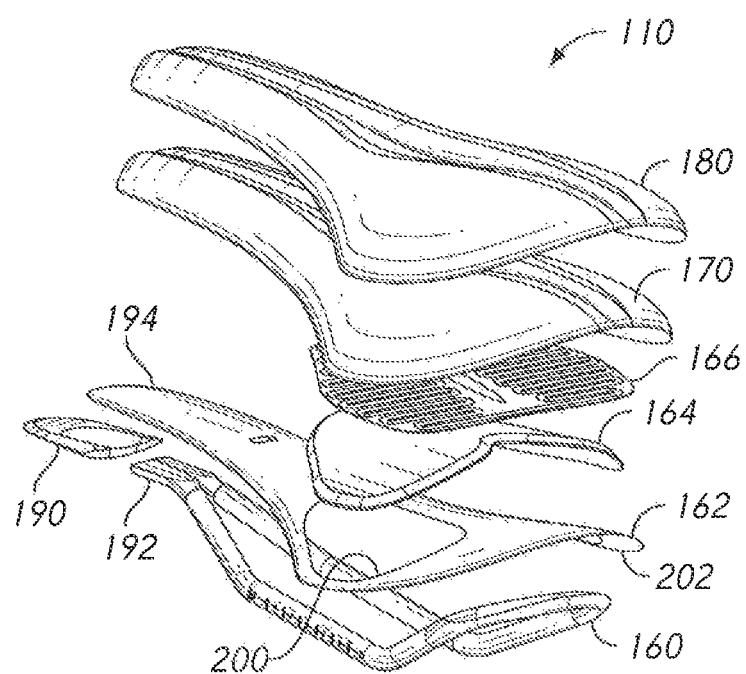
FIG. 5 is an exploded isometric view of the bicycle saddle of FIG. 4.

FIG. 5 is an isometric exploded view of the saddle 110 that includes an inner or base support shell 162, a customizable panel 164 ("panel 164"), a thermal or thermoelectric element 166 ("thermal element 166"), and a cushioning member 170. The inner support shell 162 can be supported by the rail system 160 and can be configured to support the mass of a rider. A cover 190 can cover an end 192 of the rail assembly 160 and connect to the nose end 194 of the shell 162.

The panel 164 can be made, in whole or in part, of one or more thermoplastic materials (e.g., acrylic copolymer thermoplastic), thermoset materials, or other suitable materials that can be selectively reconfigured. The shell 162 defines receiving features 200, 202 positioned at locations for customization. The receiving features 200, 202 can be openings, cutouts, recessed regions, or combinations thereof. The panel 164 can extend across the receiving features 200, 202. During a customization process, at least a portion of panel 164 is capable of passing into and/or through the features 200, 202 to conform to the rider's anatomy, thereby limiting or minimizing high pressure areas, typically under the rider's sit bones. After completing the customization process, the panel 164 can be generally rigid to maintain its shape.

The thermal element 166 can be used to selectively heat the panel 164 to a predetermined temperature (e.g., a softening temperature, a glass transition temperature, a melt temperature, or other desired temperature) and can extend across a portion or most of the upper surface of the panel 164. The thermal element 166 can remain embedded in the saddle during use and can then be used to perform additional customization processes. The thermal element 166 can be sandwiched between the cushioning member 170 and the panel 164 to help isolate the heating within the saddle 110. Additionally, the cushioning member 170 can be a thermal barrier that helps limit the temperature of outer surface of the seat, thereby preventing rider discomfort during molding. The thermal element 166 can be sufficiently compliant to conform to the molded shape of the panel 164 to remain in thermal contact with the upper surface of the panel 164.

Figure 6:
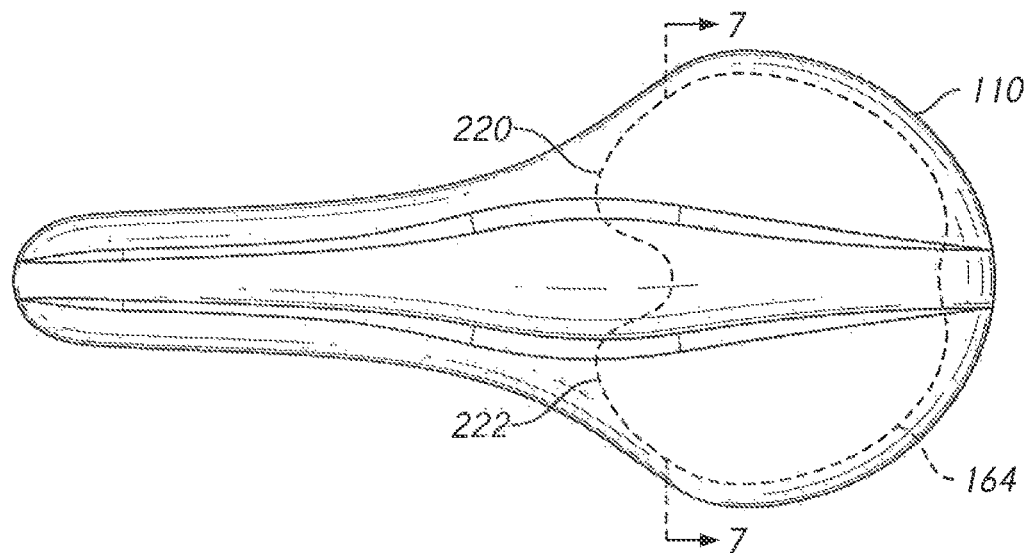
FIG. 6 is a top plan view of the bicycle saddle of FIG. 4.
Figure 7:
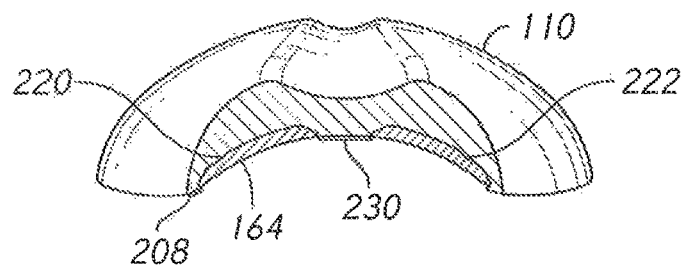
FIG. 7 is a cross-sectional view of the bicycle saddle of FIG. 6 taken along line 7-7 of FIG. 6.

FIG. 6 is a top view of the saddle 110 in accordance with an embodiment of the technology. FIG. 7 is a cross-sectional view of the saddle 110 taken along line 7-7 of FIG. 6. Referring now to FIG. 7, sit bone support wings or portions 220, 222 of the panel 164 are positioned on either side of a central spine 230 of the shell 208. The central spine 230 can help support the rider's weight to minimize, limit, or substantially prevent sagging, excessive pressure on the perineal gland, or the like.

Figure 8:
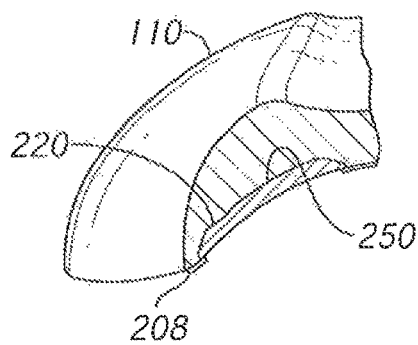
FIG. 8 is a detailed cross-sectional view of a portion of the bicycle saddle of FIG. 7.
Figure 9:
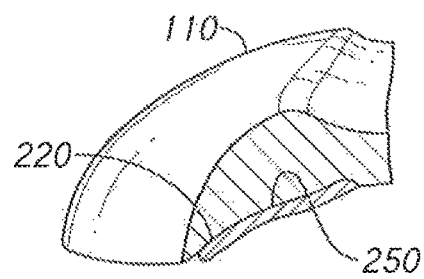
FIG. 9 is a detailed cross-sectional view of a portion of the bicycle saddle of FIG. 7 after customization.

FIGS. 7 and 8 show the portion 220 prior to molding. FIG. 9 shows the portion 220 after it has been molded. The contoured surface 250 of the portion 220 has been moved downwardly to help distribute pressure applied by the rider across the upper surface of the saddle 110. The portion 220 can be molded any number of times. The portion 220 can be molded to reduce the maximum pressure applied to the seat by a predetermined amount. For example, the maximum pressure can be reduced at least about 5%, about 10%, about 15%, about 20%, or other suitable amount to avoid excessive pressures. This helps distribute pressures applied by, for example, the sit bones to comfort manage pressure hot spots. The amount of displacement and contouring of the portion 220 will depend on the rider's anatomy and weight. Additionally, the dimensions and positions of portions 220 can be selected based on the configuration of the saddle. For example, a saddle with a width of 140 mm can have portions 220 that are closer together than a saddle with a width of 150 mm.

Figure 10:
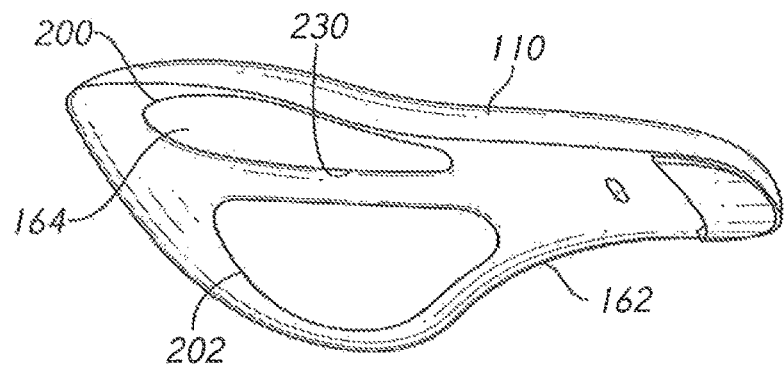
FIG. 10 is a bottom perspective view of an inner support shell in accordance with an embodiment of the technology.
Figure 11:
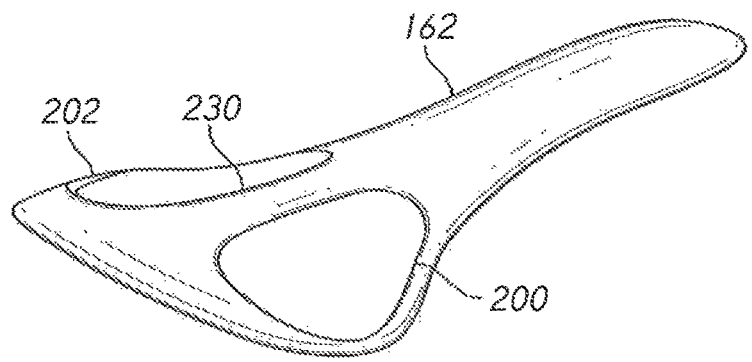
FIG. 11 is an isometric view of the inner support shell of FIG. 10.
Figure 12:
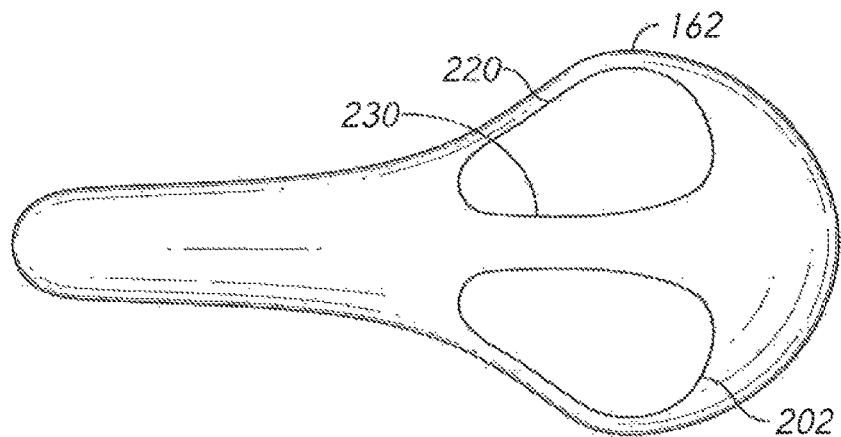
FIG. 12 is a top plan view of the inner support shell of FIG. 10.

FIG. 10 is a bottom isometric view of the saddle 110 in accordance with an embodiment of the technology. FIG. 11 is a top isometric view of the shell 162. FIG. 12 is a top view of the shell 162. Referring to FIGS. 11 and 12, the receiving features 200, 202 can be cutouts that are substantially larger than the rider's sit bones to allow the portion of the panel 164 (FIG. 5) extending across the openings to move downwardly into and/or through the openings. This allows the panel 164 (FIG. 5) to deflect a substantial amount during the molding process and avoids or limits lateral spreading of the panel 164. In other embodiments, the receiving features 200, 202 can be in the form of receiving recesses or depressions that can include one or more walls, ridges, and other features for managing spreading or movement of the moldable material. The shell 162 and customized panel 164 can be generally rigid to support the overlying parts of the saddle 110. The dimensions of the spine 230 and the receiving features 200, 202 can be selected based on the desired pressure to the perineal gland, sit bones, and other features of the rider. For example, saddle dimensions can be selected to ensure that the pressure on the perineal gland is no greater than a select amount of pressure (e.g., about 20%, about 25%, about 30%, about 35%, about 40%, about 45%, or about 50% of the pressure applied to the sit bones).

Figure 13:
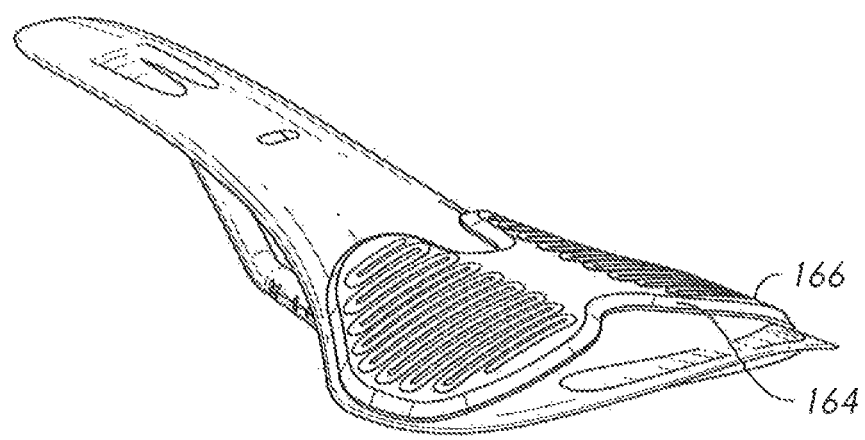
FIG. 13 is an isometric view of internal components of a bicycle saddle in accordance with an embodiment of the technology.

FIG. 13 is an isometric view of internal components of the saddle in accordance with an embodiment of the technology. The thermal element 166 can be coupled to adjacent components via adhesive, couplers (e.g., rivets), bonding agent, or combinations thereof. In other embodiments, the thermal element 166 can be attached, embedded, or encapsulated in the moldable panel 164.

Figure 14:
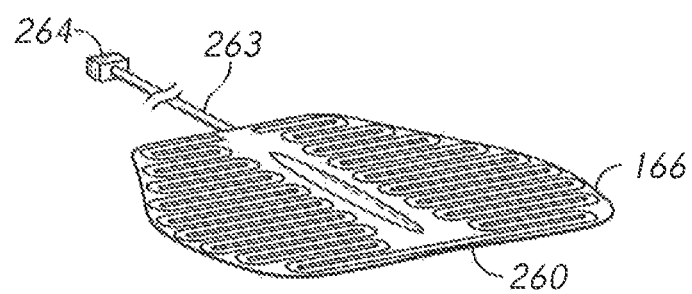
FIG. 14 is an isometric view of a thermal assembly in accordance with an embodiment of the technology.
Figure 15:
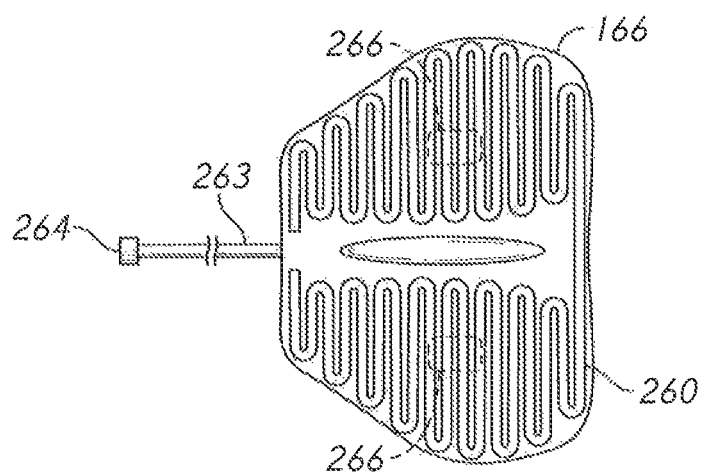
FIG. 15 is a top plan view of the thermal assembly of FIG. 14.

FIG. 14 is an isometric view of the thermal element 166 in accordance with an embodiment of the technology. The thermal element 166 can include a thermoelectric element 260 ("element 260"), a connector 263, and a plug 264. The connector 263 can provide power from the plug 264 to the element 260. The connector 263 can include one or more wires, including a bundle of wires, that provide electrical energy from the plug 264 to the element 260. The element 260 can include one or more circuits that generate heat from electrical energy. In one embodiment, each circuit can include nickel chromium tracing with an adhesive backing for adhering to the panel 164. Additionally or alternatively, the element 166 can include one or more Peltier devices, thermoelectric devices (e.g., resistive heaters), sensors (a sensor 266 is shown in dashed line in FIG. 15), or combinations thereof. The sensors can be temperature sensors, pressure sensors, contact sensors, or other sensors for providing desired detection and/or measuring. For example, temperature sensors can be used to monitor temperatures during the fitting process, and pressure sensors can be used to measure pressures to ensure a comfortable fit or to track a rider's data. The components of the element 166 can be flexible to assume different configurations without affecting performance of the element 166. This allows the thermal element 166 to be used to perform any number of molding procedures. For example, the element 260 can be a flexible resistive heater capable of experiencing significant deformation and/or displacement without any appreciable impairment of the element 260's heating/cooling capabilities.

Figure 16:
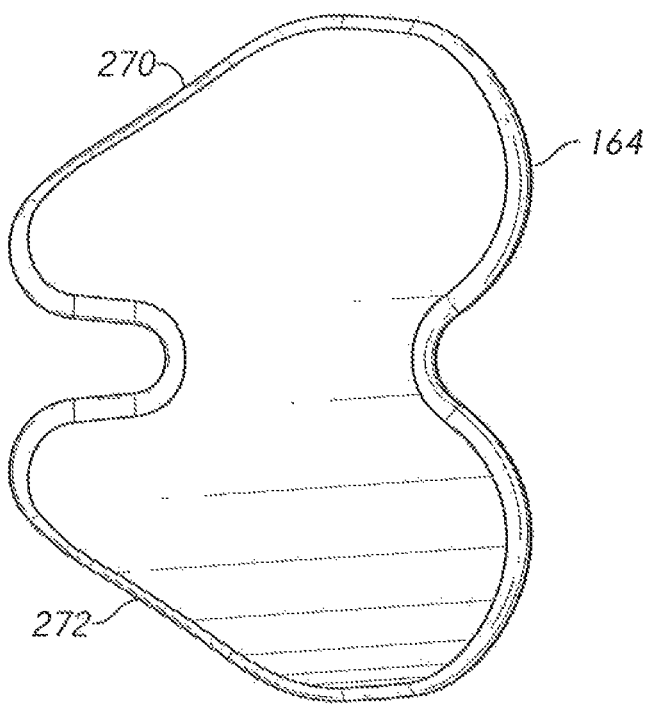
FIG. 16 is a top plan view of a moldable panel in accordance with an embodiment of the technology.
Figure 17:
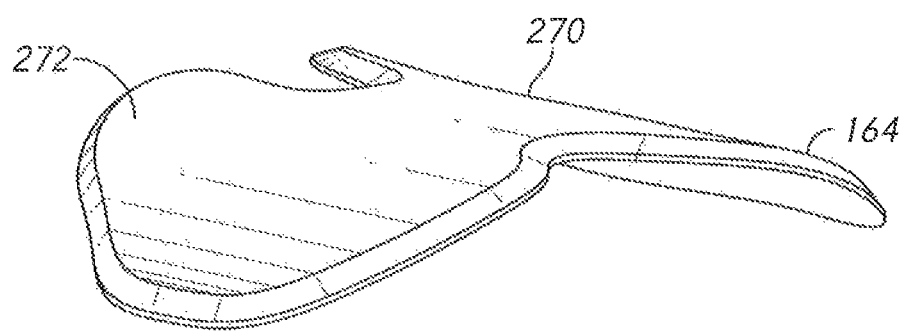
FIG. 17 is an isometric view of the moldable panel of FIG. 16.

FIG. 16 is a top plan view of the panel 164. FIG. 17 is an isometric view of the panel 164. Referring now to FIGS. 16 and 17, the panel 164 includes a first and second wings 270, 272 that are configured to overlay the receiving features of the shell. In some embodiments, the panel 164 can be made, in whole or in part, of acrylic copolymer plastic, thermoplastic material, thermoset resins, or other types of moldable materials. In one embodiment, the panel 164 is an acrylic thermoplastic sheet or member with a thickness equal to or less than about 2.5 mm, about 3 mm, about 3.2 mm, about 3.5 mm, about 4 mm, or the like. The material can be sufficiently thick to maintain its post-molded shape during normal use. In some embodiments, the panel 164 include one or more thermoformable foam layers and can be replaceable or permanent. For example, the panel 164 can be a single foam layer made of a thermoplastic material, such as a thermoplastic blend or single thermoplastic material.

The saddle can have different types of thermal elements. Exemplary thermoelements include, without limitation, heating/cooling channels, thermoelectric elements, or combinations thereof. The moldable portions of the saddle can support a significant portion of the rider's mass. In some embodiments, the moldable portions of the saddle can support at least about 50%, about 60%, about 70%, about 80%, or about 90% of the total mass of the rider such that majority of the mass supporting portion of the saddle is molded to the rider's body. During the molding process, the rider can pedal the bicycle and assume normal riding positions. The cushioning element of the saddle can ensure that the thermoelement does not alter the cushioning characteristics of the saddle. Thermoelements can be embedded in the cushioning member, the support shell, moldable panels, or components of the saddle. In some embodiments, the thermoelement is sandwiched between the cushioning member and a moldable panel extends across one or more openings of a rigid shell. The rigid shell can maintain its shape during and/or after the molding process. For example, the rigid shell can be made of metal, carbon fiber, or another suitable material capable of withstanding relatively high temperatures without experiencing substantial permanent deformation.

Figure 18:
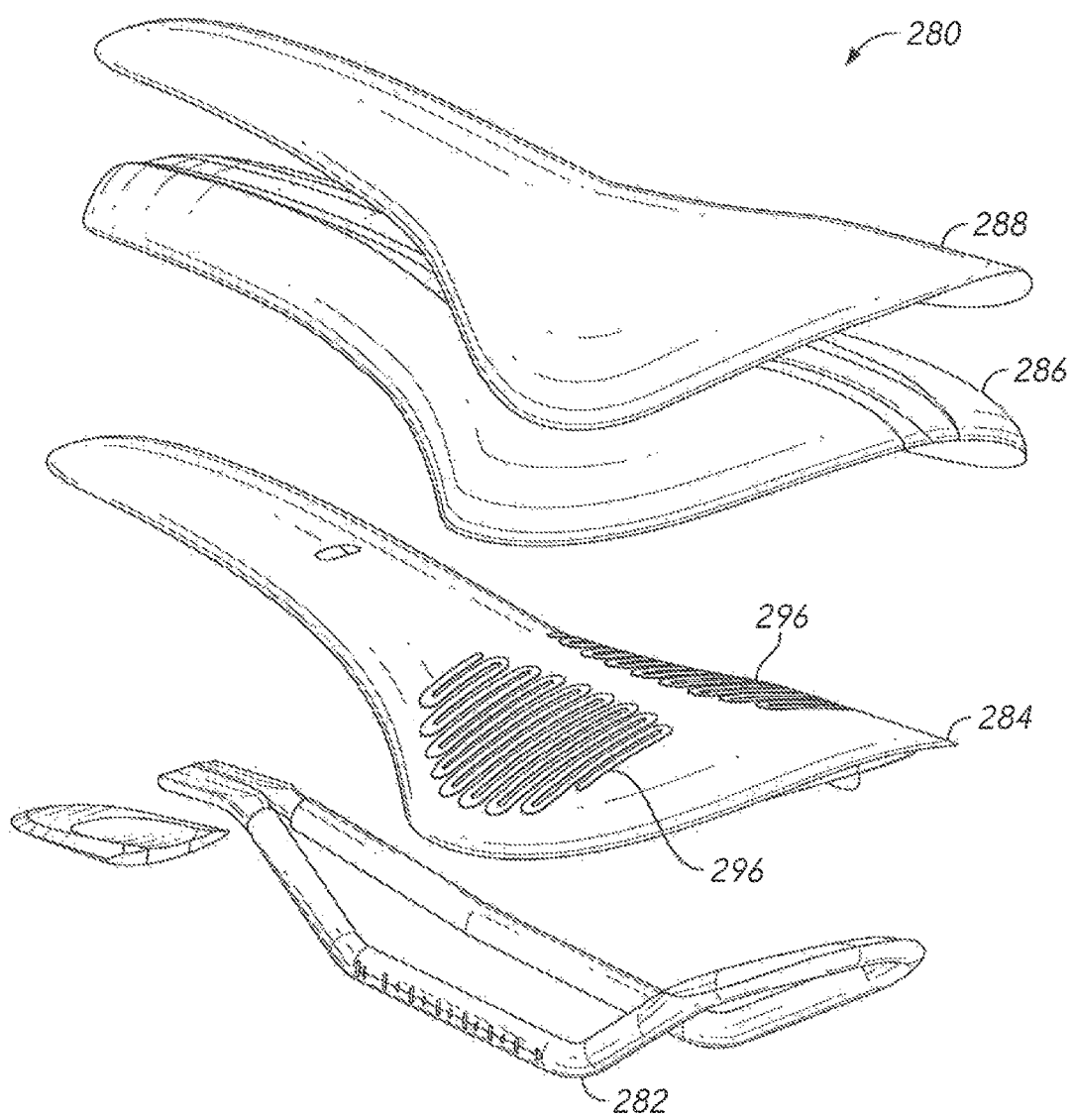
FIG. 18 is an exploded isometric view of a bicycle saddle in accordance with an embodiment of the technology.

FIG. 18 is an exploded isometric view of a bicycle saddle 280 in accordance with an embodiment of the technology. The bicycle saddle 280 can include a rail system 282, a customizable support shell 284, a cushioning member 286, and a covering 288. The customizable support shell 284 can be a base shell supported by the rail system 282. The description of the saddle 110 discussed in connection with FIGS. 1-17 applies equally to the saddle 280, except as detailed below.

The support shell 284 can include one or more integrated thermal or thermoelectric elements 296. The bicycle saddle 280 has two spaced apart thermoelectric elements 296, each positioned generally underneath the rider's sit bones during use. During a molding procedure, the thermoelectric elements 296 can heat regions of the support shell made of thermoplastic material to thermoform those regions.

Figure 19:
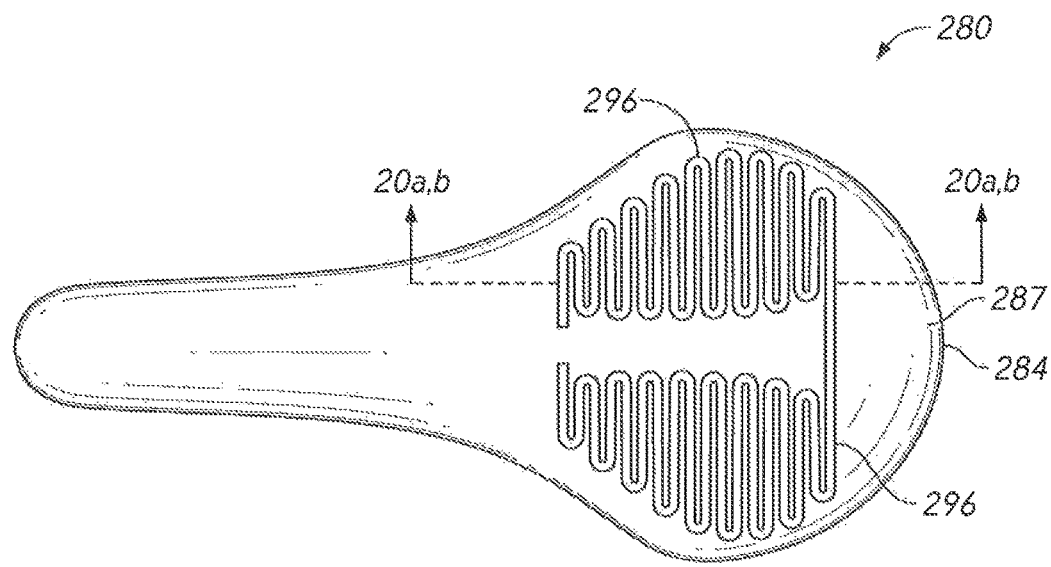
FIG. 19 is top plan view of a support shell in accordance with an embodiment of the technology.

FIG. 19 is a top view of the bicycle saddle 280 in accordance with embodiment of the technology. The support shell 284 includes a main body 287 that can be made, in whole or in part, of thermomolecular plastic materials. The thermoelectric elements 296 can be interconnected or connected resistive heaters that are attached to or embedded in the main body 287. In some embodiments, the thermoelectric elements 296 can be electrically connected to one another to heat opposite sides of the saddle to uniform temperatures. In other embodiments, the thermoelectric heaters 296 can be electrically isolated to individually mold opposite sides of the saddle. For example, each side of the saddle can be molded at different times to enable enhances customization.

Figure 20A:
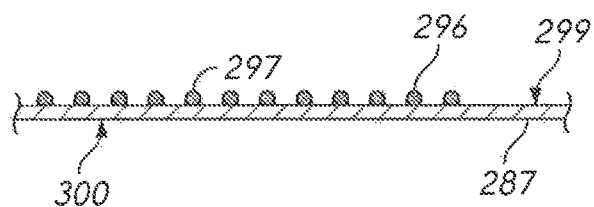
FIG. 20$a$ is a cross-sectional view of the support shell taken along line 20$a$-20$a$ of FIG. 19.

FIG. 20a is a cross sectional view of the support shell 284 taken along line 20a-20a of FIG. 19. The thermoelectric element 296 can include an array of elements 297 (one identified) attached to an upper surface 299 of the main body 287. The elements 297 remain in thermal contact with the upper surface 299 throughout use. In other embodiments, the elements 297 can be attached to an undersurface 300 of the main body 287. The elements 297 can also be positioned at other locations. In some embodiments, elements 297 are positioned along both the upper surface 299 and the bottom surface 300. The position, number, and configuration of the elements 297, whether resistive elements or cooling channels, can be selected based on the desired comfort of the seat, desired heating characteristics, or the like.

Figure 20B:
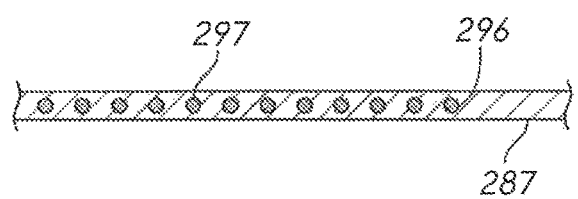

FIG. 20b is a cross-sectional view of the support shell 284 take along the line 20b-20b of FIG. 19 in accordance with another embodiment. The description of the thermoelectric element 296 of FIGS. 19 and 20a apply equally to FIG. 20b except as detailed below. FIG. 20b shows the elements 297 embedded in the main body 287. The elements 297 can be flexible for molding the main body 287 to highly contoured shapes while without damaging the thermoelectric element 296.

Figure 21:
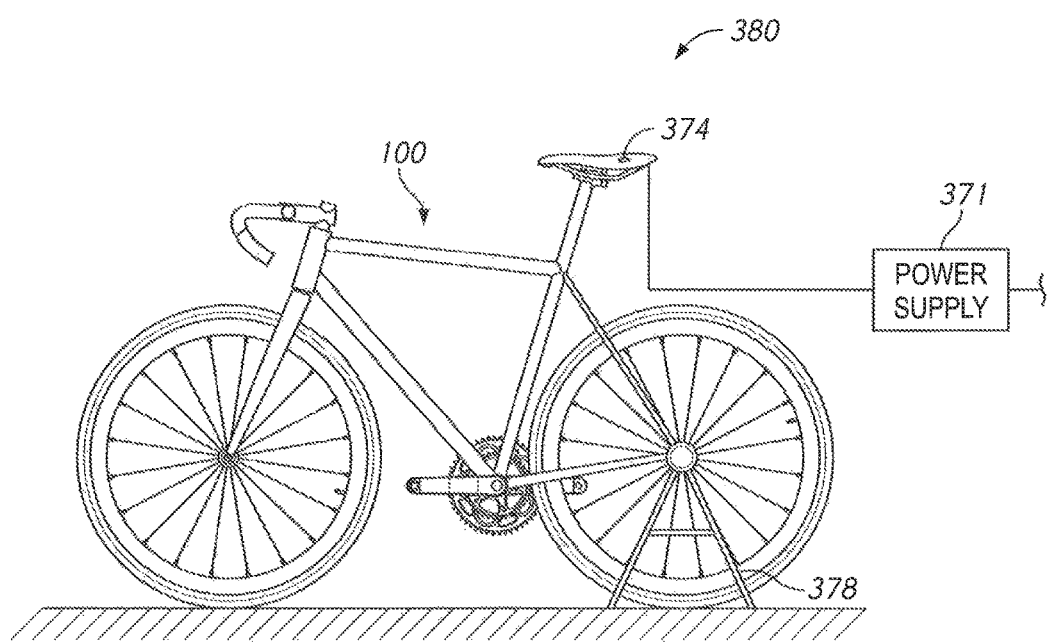
FIG. 21 illustrates a system for customizing a bicycle saddle in accordance with an embodiment of the technology.

FIG. 21 illustrates a system 380 for customizing a bicycle saddle in accordance with an embodiment of the technology. The system 380 includes the bicycle 100 and a stand 378. The system 380 can include optional sensors 374, such as pressure sensors, contact sensors, force sensors, or other suitable detectors for sensing desired parameters. Electrical components of the saddle (e.g., sensors, heating elements, etc.) can receive power from an electrical power source 371, such an AC outlet, via a wired connection, or power from an internal power source, such as a battery integrated into the saddle. The system 380 can also include optional rider monitoring or positioning equipment.

Figure 22:
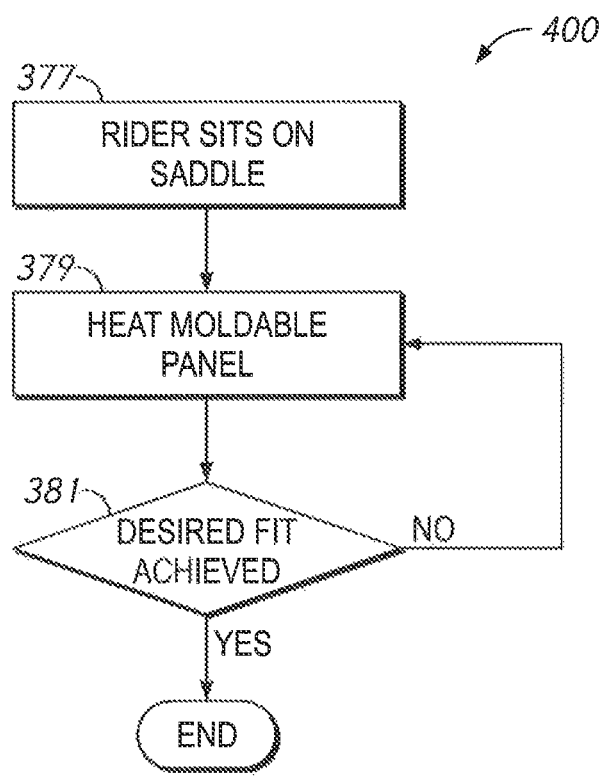
FIG. 22 is a method for fitting a bicycle saddle in accordance with an embodiment of the technology.

FIG. 22 illustrates a method 400 for fitting a saddle in accordance with an embodiment of the technology. The method 400 can be performed using the systems discussed in connection with FIG. 21 or other systems disclosed herein.

At block 377, a rider can sit on the saddle and ride the bicycle. The bicycle can be set up based on the rider's anatomy. For example, the saddle height can be set using various fitting techniques.

At block 379, the saddle can be heated for thermoforming before or after the rider begins riding. A heating element (e.g., thermal element 166 discussed in connection with FIG. 5) can be used to internally heat the panel 164. The cushioning member 170 (FIG. 5) can thermally insulate the element 166 to avoid overheating the rider. In some embodiments, the cushioning member 170 can be a foam covering with geometry that generally matches the geometry of the inner support shell 162. In one embodiment, the cushioning member 170 comprises, in whole or in part, urethane foam. In other embodiments, the panel can be integrated with or part of the shell or support structure of the saddle.

An external heating source can be used to heat the seat 110. The saddle can be heated with a hair dryer, an oven, or suitable heating environment. Temperature sensors can be coupled to the outside or can be located within the saddle to track the temperatures. If a moldable component of the saddle is heated with an external element, the saddle can be monitored with a temperature detector.

Once customized, the saddle can be passively or actively cooled until it retains its shape. For example, a molded panel can be actively cooled via liquid (e.g., chilled water), Peltier devices, or air cooled (e.g., convection air cooled). Alternatively, the panel can be allowed to be passively cooled via the surrounding environment, which may be at or near room temperature. When the temperature of the panel is below its glass transition temperature, it can retain its shape.

At block 381, the panel can be remolded based on rider feedback, diagnostic results, or the like. The original saddle set up and data can be compared with the unmolded seat data to compare the pressure, pressure peaks, rider feedback, or other parameters. If the desired fitting is not achieved, the method 400 can return to block 379. The panel can be thermally processed any number of times until a desired fit is achieved. If the rider's weight or size changes significantly, the saddle may become uncomfortable. The method 400 can be performed to refit the saddle.

Figure 23:
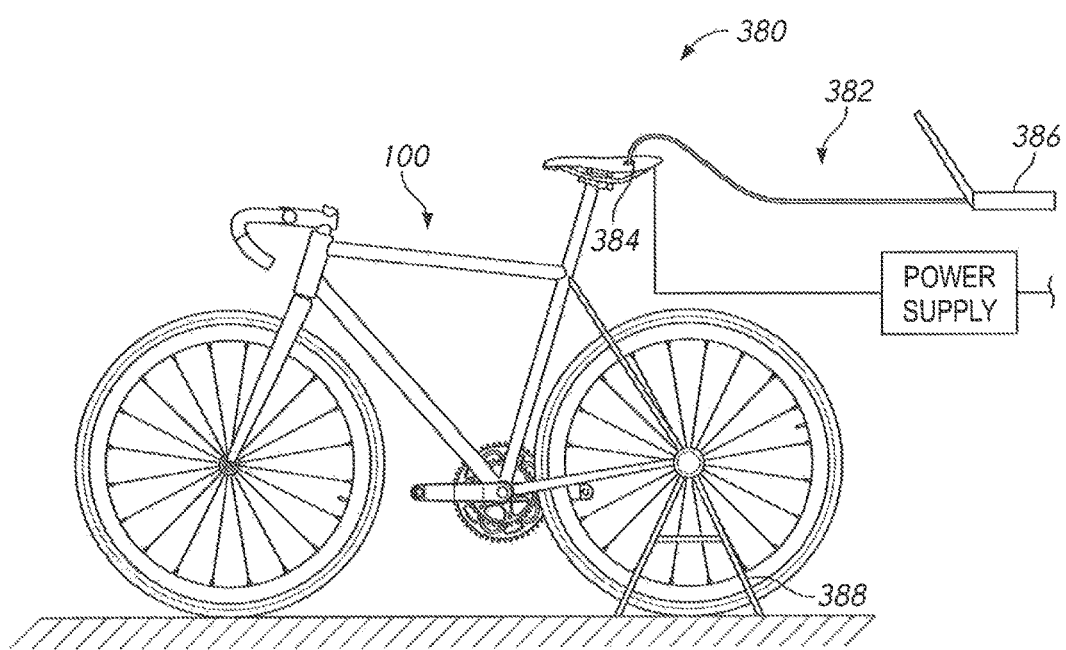
FIG. 23 illustrates a system for customizing a bicycle saddle in accordance with another embodiment of the technology.

FIG. 23 illustrates a system 380 for customizing a bicycle saddle in accordance with an embodiment of the technology. The system 380 includes the bicycle 100 and a fitting system 382. The fitting system 382 can include one or more sensors 384, a computing device or computer 386, and a stand 388. The sensors 384 can be pressure sensors, contact sensors, force sensors, or other suitable detectors for sensing desired parameters. In some embodiments, the sensors 384 are coupled to or integrated into the seat. In other embodiments, sensors 384 can be separate components that are placed on the seat 110 during the fitting process and then removed. Electrical components of the saddle (e.g., sensors, heating elements, etc.) can be powered by an electrical power source 285, such an AC outlet, a battery, or the like.

A computing device 386 is in communication with the sensors 384 and can be a laptop computer, a smartphone, or other computer device. Examples of computing devices, environments, and/or configurations that may be suitable for use with the technology include, but are not limited to, personal computers, server computers, handheld or laptop devices, cellular telephones, wearable electronics, tablet devices, multiprocessor systems, microprocessor-based systems, distributed computing environments that include any of the above systems or devices, or the like. For example, the computing device 386 can be a tablet that communicates with the sensor 384 via a wired connection or wirelessly via a local area network. The computing device 386 can include one or more input devices that can include, for example, a mouse, a keyboard, a touchscreen, an infrared sensor, a touchpad, a wearable input device, a camera- or image-based input device, a microphone, or other user input devices.

The computing device 386 can include memory that has one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory can include program memory that stores programs and software, such as an operating system, a data management system, and other application programs, such as fitting programs, molding programs, or the like. In some embodiments, the memory can store programs for performing the method discussed in connection with FIG. 22.

Figure 24:
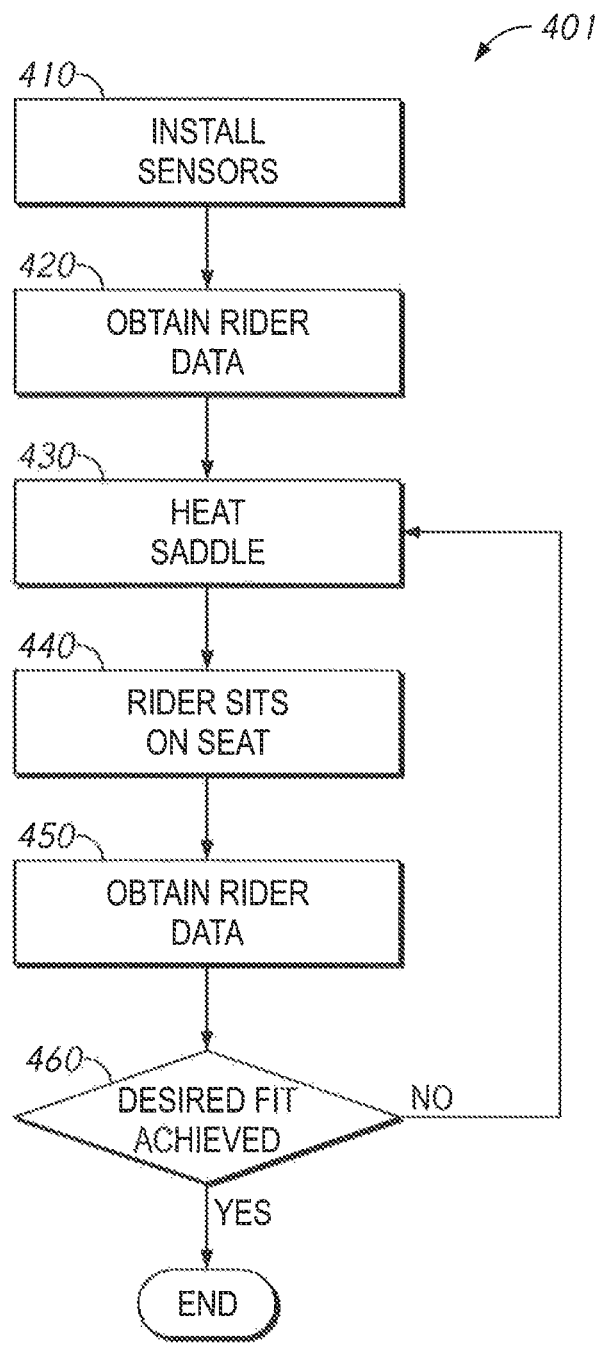
FIG. 24 is a method for fitting a bicycle saddle in accordance with another embodiment.

FIG. 24 illustrates a method 401 for fitting a saddle in accordance with an embodiment of the technology. The method 401 can be performed using the system discussed in connection with FIG. 23 and the description of the method 400 of FIG. 22 applied equally to method 401 unless indicated otherwise.

At block 410, sensors can be installed on a bicycle saddle to map pressures applied by a user to a seat. Sensors can also be positioned in other locations along the bicycle. Additionally or alternatively, motion sensors can be used to track the rider's movement.

At block 420, rider data can be obtained to determine one or more baseline measurements. In some procedures, pressures associated with the sit bones can be measured. The bicycle saddle can be installed on a bicycle at a desired location to achieve a desired body position. Once the bicycle is set up, the panel can be heated to a predetermined temperature suitable for molding.

At block 430, a heating element (thermal element 166 discussed in connection with FIG. 5) of a thermal system can be used to internally heat the panel 164. The cushioning member 170 (FIG. 5) can thermally insulate the element 166 to avoid overheating the rider. In some embodiments, the cushioning member 170 can be a foam covering with geometry that generally matches the geometry of the inner support shell 162. In one embodiment, the cushioning member 170 comprises, in whole or in part, urethane foam.

Additionally or alternatively, an external heating source can be used to heat the seat 110. The panel can be heated with a hair dryer, an oven, or suitable heating environment. Temperature sensors can be coupled to the outside or can be located within the saddle to track the temperatures. If the panel is heated with an external element and then installed in the saddle, it can be monitored with a temperature detector (e.g., a laser gun) to ensure that the temperature of the panel, including temperatures across the panel, are at desired levels.

At block 440, the rider can sit on the seat and can pedal the bicycle for a set period of time. At various times, the rider can change body positions for a range of normal riding positions. For example, the rider can periodically change from an upright to a forward position at regular or irregular intervals. In some procedures, the rider can pedal for two minutes, five minutes, six minutes, seven minutes, eight minutes, nine minutes, ten minutes, fifteen minutes, 20 minutes, or another length of time. The length of time the rider pedals can be selected based on the thermoforming characteristics of the panel and the temperature of the panel at the start of the pedaling period. In some fitting procedures, the rider can pedal the bicycle for a length of time generally corresponding to a length of time at which the panel 164 is sufficiently warm for molding.

At block 450, rider data can be obtained. Measurements associated with the pressure applied to the seat (e.g., sit bone pressure measurements) can be continuously or periodically obtained while the user pedals the bicycle, as well as after the rider completes pedaling. If the bicycle saddle does not have internal pressure sensors, a pressure sensor (e.g., sensor 374 in FIG. 21) can be installed on the bicycle saddle to take pressure recordings for a set period of time (e.g., 10 seconds, 20 seconds, 30 seconds, 45 seconds, and 1 minute, 3 minutes, and 5 minutes). In other embodiments, the saddle can be fitted without taking rider measurements. For example, the rider can determine an appropriate fit based on comfort level without any pressure or force measurements.

At block 460, if the desired fit is achieved, the fitting procedure is completed. If the desired fitting is not achieved, the method 401 can return to block 430 to remold the saddle. The saddle can be thermally processed any number of times until a desired fit is achieved. The original saddle set up and data can be compared with the unmolded seat data to compare pressures, pressure peaks, pressure reductions, and the rider feedback.

A wide range of fitting procedures can be used for bicycle saddles disclosed herein. In some procedures, the handlebar to nose dimension and a pitch angle on the bicycle and saddle set up are measured. A pressure mapping sensor can be installed on the bicycle to take interval recordings of pressure measurements.

In some fitting procedures, moldable bicycle seat can be installed on the seat post and positioned in the same location as the previous conventional seat. A pressure sensor can be positioned on the seat for interval data collection. Optionally, the position of the seat can be micro adjusted fore-and-aft to position the sit bones within moldable regions, achieve desired comfort, or the like. Additionally, and alternatively, the pitch can be adjusted to adjust pressure at the nose. For example, the nose can be angled a certain angle (e.g., by 1°, 2°, 3°, 4°, etc.) from horizontal to begin the fitting process. The tilt angle can be adjusted during the fitting. Once fitted, the thermoforming process can be performed.

In some procedures, the seat saddle can be removed from the bicycle post and then heated to a desired temperature. The target temperature can be equal to or higher than about 50° C., about 55° C., about 60° C., about 65° C., about 70° C. or other temperatures based on the suitable temperature of the panel for molding. Temperature sensors can be used to measure the temperature of the surface of the seat, moldable panel and/or other component. In embodiments with internal heaters of the seat saddle, the saddle can be left on the bicycle during the heating process. If the saddle is removed for heating, it can be reinstalled on the bicycle at the desired position.

A rider can mount the bicycle and can pedal for a period of time while periodically moving their position to normal riding positions. The pressure sensor can detect the pressure applied to the saddle to evaluate the fit. The data before and after the molding process can be compared to determine whether additional molding should be performed. If additional molding should be performed, the data can be analyzed to determine parameters of the molding process, such as the length of the molding process, target molding temperature, or the like. The seat saddle can be removed at any number of times at any point in time to readjust the fit as needed.

Figure 25:
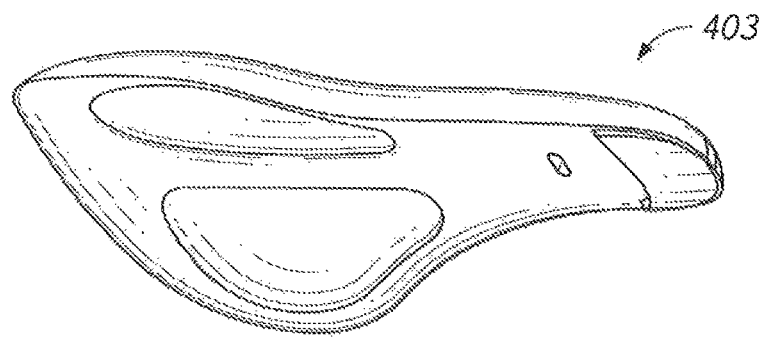
FIG. 25 is a bottom isometric view of a bicycle saddle in accordance with an embodiment of the technology.
Figure 26:
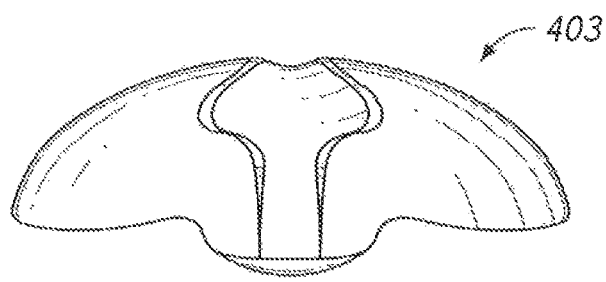
FIG. 26 is a front view of the bicycle saddle of FIG. 25.
Figure 27:
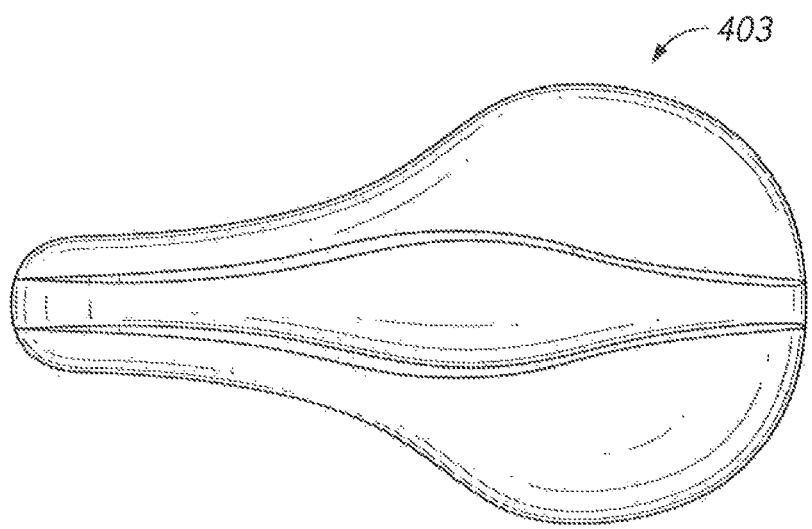
FIG. 27 is a top plan view of the bicycle saddle of FIG. 25.

FIG. 25 is an isometric view of a moldable seat saddle in accordance with an embodiment of the technology. FIG. 26 is a front view of the seat saddle 403. FIG. 27 is a top view of the seat saddle 403. The seat saddle 403 can be generally shorter than seat saddle 110 discussed in connection with FIGS. 1-19. A comparison of FIG. 25 to FIG. 12 shows the difference in the general shape of the saddles. The saddle 403 can include any number of moldable panels.

Figure 28:
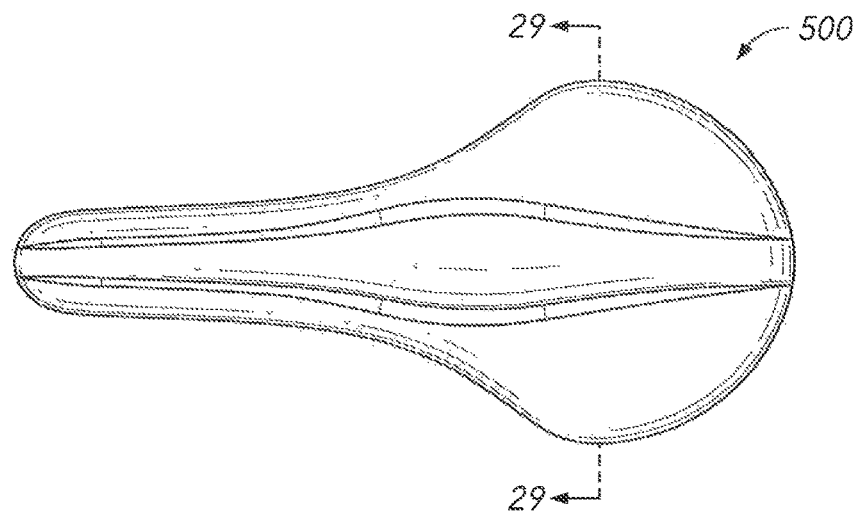
FIG. 28 is a top plan view of a saddle in accordance with an embodiment of the technology.
Figure 29:
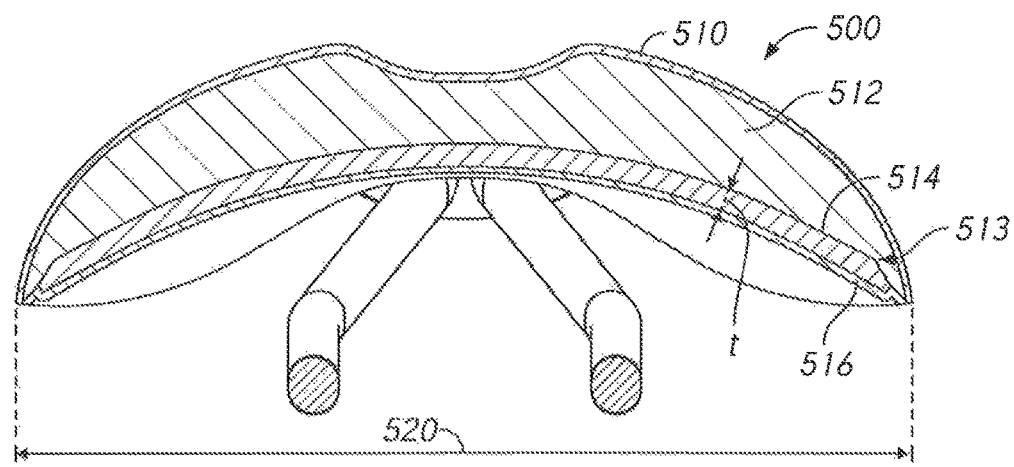
FIG. 29 is a cross-sectional view of the saddle taken along line 29-29 of FIG. 28 prior to performing a fitting process.

FIG. 28 is a top plan view of the saddle 500 in accordance with an embodiment of the technology. FIG. 29 is a cross-sectional view of the pre-molded saddle 500 taken along line 29-29 of FIG. 28. Referring to FIG. 29, the saddle 500 can include an outer layer 510, a cushioning element or layer 512, and a moldable support shell 513. The outer layer 510 can be a covering that overlays the cushioning element 512. The cushioning element 512 can be made, in whole or in part, of one or more cushioning materials, such as foam (e.g., open or closed-cell foam), padding, or combinations thereof. The moldable support shell 513 can include the moldable layer 514 and a rigid base shell or support structure 516 ("support structure 516"). The layer 514 can be positioned directly below the cushioning element 512 and supported by the support structure 516. The cushioning element 512 and/or support structure 516 may or may not be thermoformable itself.

The cushioning layer 514 can be a mono-layer or multi-layer and can be made, in whole or in part, of one or more compressible moldable materials. The layer 514 can have a thickness t between about 1 mm and about 5 mm, about 2 mm and about 3 mm, about 3 mm and about 4 mm, or other suitable uniform or varying thicknesses. In certain embodiments, the thickness t can be equal to, less than, or greater than about 1 mm, 2 mm, 3 mm, 4 mm, 5 mm, or 6 mm. The thickness t can be increased at regions directly beneath the sit bones to allow for significant compressibility at high pressure sites. In other embodiments, the thermoformable layer 514 can have a generally uniform thickness across the saddle width 520. This allows the saddle to be thermoformed to a wide range of different rider body geometries (e.g., female bodies, male bodies, etc.).

Figure 30:
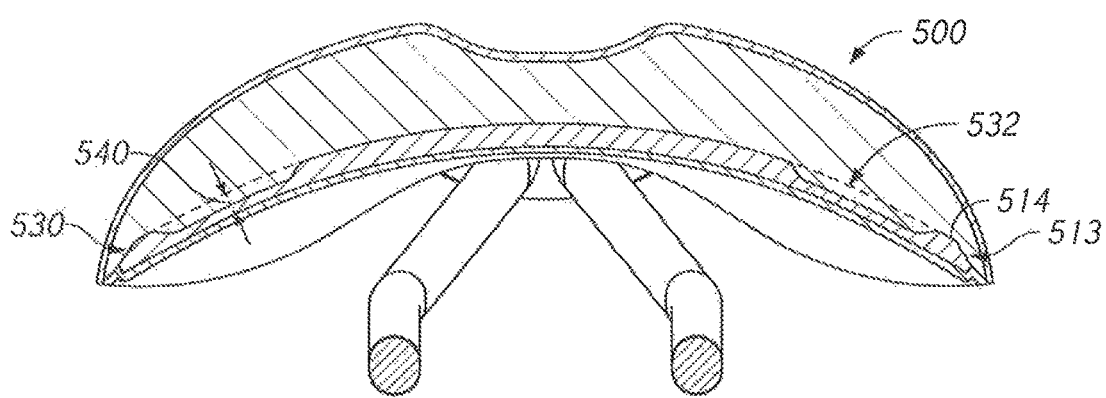
FIG. 30 is a cross-sectional view of the saddle taken along line 29-29 of FIG. 28 after completing the fitting process.

FIG. 30 shows the thermoformable layer 514 after it has been molded. Two regions 530, 532 of the layer 514 have been compressed a distance 540. The distance 540 can be between about 0.5 mm and about 1.5 mm, about 1 mm and about 3 mm, about 1 mm and about 5 mm, or other desired amounts. The distance of compression will vary based upon the thickness of the layer 514 and the user's weight. Each compressed area of the respective region 530, 532 can cover an area equal to, larger than, or smaller than 4 $cm^2$, 6 $cm^2$, 8 $cm^2$, 10 $cm^2$, 20 $cm^2$ 30 $cm^2$, 50 $cm^2$, or another suitable area. Additionally or alternatively, each compressed area of the respective region 530, 532 can cover an area equal to, larger than, or smaller than 20%, 30%, 40%, or 50% of the total seat area. The molded regions 530, 532 of FIG. 30 allow the rider's sit bones to preferentially sit directly above the regions 530, 532, thereby helping to distribute stresses or pressures to other parts of the saddle 500 and/or helping to position the rider's body with the saddle.

Although the cushion element 514 is illustrated as a single continuous layer across most of the width 520 of the saddle 500, the cushion element 514 can include a plurality of separate discrete thermoformable layers, panels, inserts, or the like. One thermoformable layer can be positioned on one side of the saddle 500 and another thermoformable layer 514 can be positioned on the other side of the saddle.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A customizable bicycle saddle comprising:
   padding; and
   a support shell located underneath the padding and configured to support a rider's body, the support shell including at least one internal thermal element that is capable of heating the support shell to mold one or more thermoformable portions of the support shell to a rider's anatomy while the rider is supported by the customizable bicycle saddle, wherein the molded one or more thermoformable portions are rigid to maintain their shape during use.

2. The customizable bicycle saddle of claim 1, wherein the at least one internal thermal element is embedded within the customizable bicycle saddle and configured to heat the one or more thermoformable portions of the support shell subjected to relatively high applied pressures to a predetermined temperature, wherein the predetermined temperature is a softening temperature, a glass transition temperature, or a melt temperature of the thermoformable portions.

3. The customizable bicycle saddle of claim 1, wherein the support shell includes a frame, wherein the one or more thermoformable portions include a first ischial tuberosity bone supporting portion positionable in a first receiving feature of the frame, and a second ischial tuberosity bone supporting portion positionable in a second receiving feature of the frame, and wherein the first and second ischial tuberosity bone supporting portions are thermoformable to the rider's anatomy after the first and second ischial tuberosity bone supporting portions have been heated by the at least one internal thermal element.

4. The customizable bicycle saddle of claim 1, wherein the support shell includes a frame member and the one or more thermoformable portions are in thermal contact with the at least one internal thermal element, wherein the one or more thermoformable portions are positioned to support the rider's sit bones.

5. The customizable bicycle saddle of claim 1, wherein the one or more thermoformable portions include a thermoplastic main body and the at least one internal thermal element is embedded in the thermoplastic main body.

6. The customizable bicycle saddle of claim 1, wherein the at least one internal thermal element is permanently embedded in the customizable bicycle saddle and capable of selectively heating the support shell while the rider is supported by the customizable bicycle saddle.

7. The customizable bicycle saddle of claim 1, wherein the one or more thermoformable portions include a customizable ischial tuberosity panel configured to retain its molded shape when at room-temperature and to be remolded when heated, by the at least one internal thermal element, above a predetermined temperature.

8. The customizable bicycle saddle of claim 1, wherein the one or more thermoformable portions have an ischial tuberosity region comprising a thermoplastic material, and wherein the ischial tuberosity region is configured to mold to the rider's anatomy sitting on the customizable bicycle saddle after the ischial tuberosity region has been heated above a predetermined temperature.

9. The customizable bicycle saddle of claim 1, wherein the padding covers the support shell.

10. The customizable bicycle saddle of claim 1, wherein the support shell is configured to retain its molded shape when at room-temperature and is configured to be remolded when heated above the predetermined temperature.

11. The customizable bicycle saddle of claim 1, wherein the at least one internal thermal element extends across most of a width of the support shell.

12. The customizable bicycle saddle of claim 1, wherein the at least one internal thermal element is positioned to heat one or more high pressure areas along the support shell.

13. A bicycle saddle comprising:
an inner support shell including a first receiving feature and a second receiving feature;
at least one heater; and
a customizable ischial tuberosity panel including at least one thermoplastic material, a first ischial tuberosity bone supporting portion positionable in the first receiving feature, and a second ischial tuberosity bone supporting portion positionable in the second receiving feature, and wherein the ischial tuberosity panel is configured to be heated by the at least one heater such that the ischial tuberosity panel molds to a rider's anatomy sitting on the customizable bicycle saddle after the ischial tuberosity panel has been heated above a predetermined temperature, wherein the ischial tuberosity panel is configured to be rigid after the ischial tuberosity panel has been cooled below the predetermined temperature.

14. The bicycle saddle of claim 13, wherein the customizable ischial tuberosity panel is configured to retain its molded shape when at room-temperature and is configured to be remolded when heated above the predetermined temperature.

15. The bicycle saddle of claim 13, wherein the inner support shell has a spine extending longitudinally along the bicycle saddle, wherein the spine is positioned between the first and second receiving features.

16. The bicycle saddle of claim 13, wherein the predetermined temperature is a softening, a glass transition, or a melt temperature of the thermoplastic material.

17. The bicycle saddle of claim 13, further comprising:
a cushion configured to cover the inner support shell; and
wherein the at least one heater is positioned between the cushion and the inner support shell and has a heating state for heating the ischial tuberosity panel to the predetermined temperature.

18. The bicycle saddle of claim 13, wherein the at least one heater comprises a thermoelectric heater configured to receive electrical energy and to generate a sufficient amount of thermal energy to heat the ischial tuberosity panel to the predetermined temperature.

19. A bicycle saddle comprising:
an inner support shell including having a first receiving feature and a second receiving feature;
a heater; and
a moldable panel having a first portion and a second portion, wherein the first portion is positionable in the first receiving feature, wherein the second portion is positionable in the second receiving feature, and wherein when the moldable panel is heated by the heater, the moldable panel is thermoformable to accommodate a subject's anatomy to reduce high pressures when the subject sits on the bicycle saddle, wherein the thermoformed moldable panel maintains its shape when the subject sits on the bicycle saddle.

20. The bicycle saddle of claim 19, wherein the first receiving feature is positioned to be underneath one of the subject's ischial tuberosity bones and the second receiving feature is positioned to be underneath the other one of the subject's ischial tuberosity bones when the subject is centered on the saddle.

* * * * *